(No Model.) 2 Sheets—Sheet 1.

N. W. DAVIS.
RAIN WATER CUT-OFF AND FILTER COMBINED.

No. 375,270. Patented Dec. 20, 1887.

Witnesses
Ella S. Johnson
Wm. R. Williams

Inventor
Nelson W. Davis
By his Attorneys
Johnson & Johnson (No Model.) 2 Sheets—Sheet 2.
N. W. DAVIS.
RAIN WATER CUT-OFF AND FILTER COMBINED.
No. 375,270. Patented Dec. 20, 1887.
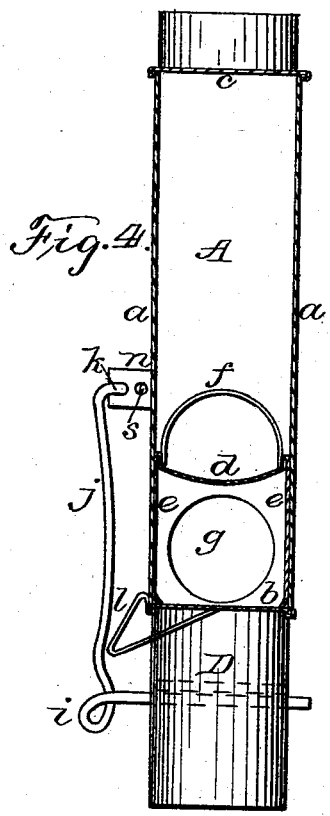
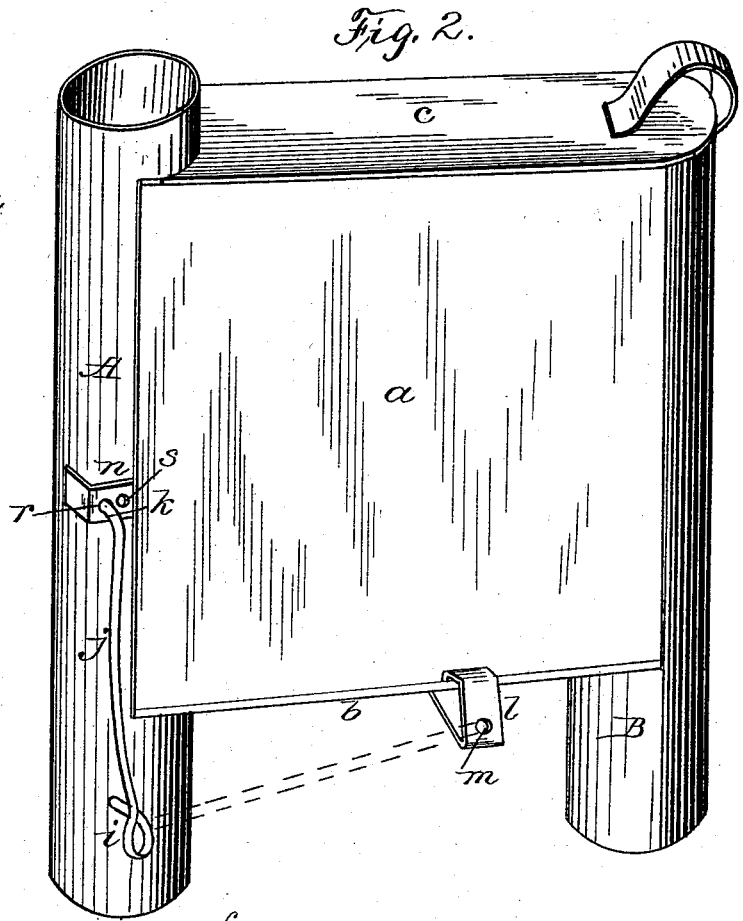
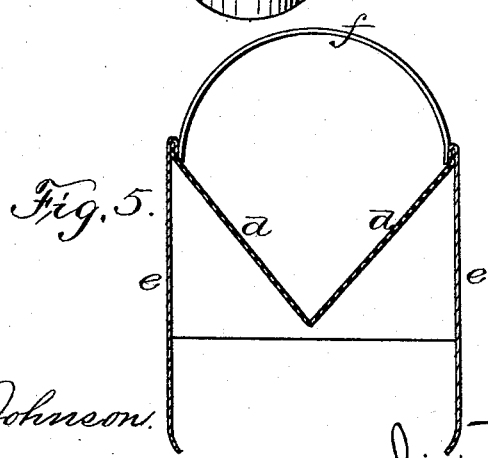
Witnesses
Ella S. Johnson.
Wm. R. Williams
Inventor
Nelson W. Davis.
By his Attorneys
Johnson and Johnson

UNITED STATES PATENT OFFICE.

NELSON W. DAVIS, OF PORT JEFFERSON, NEW YORK.

RAIN-WATER CUT-OFF AND FILTER COMBINED.

SPECIFICATION forming part of Letters Patent No. 375,270, dated December 20, 1887.

Application filed August 25, 1887. Serial No. 247,837. (No model.)

*To all whom it may concern:*

Be it known that I, NELSON W. DAVIS, a citizen of the United States, residing at Port Jefferson, in the county of Suffolk and State of New York, have invented new and useful Improvements in Rain-Water Cut-Off and Filter Combined, of which the following is a specification.

My invention consists of an improved cistern attachment for filtering and turning the water in or out of the cistern; and the object of my improvement is to provide for cleaning the filter without disturbing its connections with the house-pipe or cistern, to prevent freezing, and to simplify and increase the durability of the device.

Figure 1:
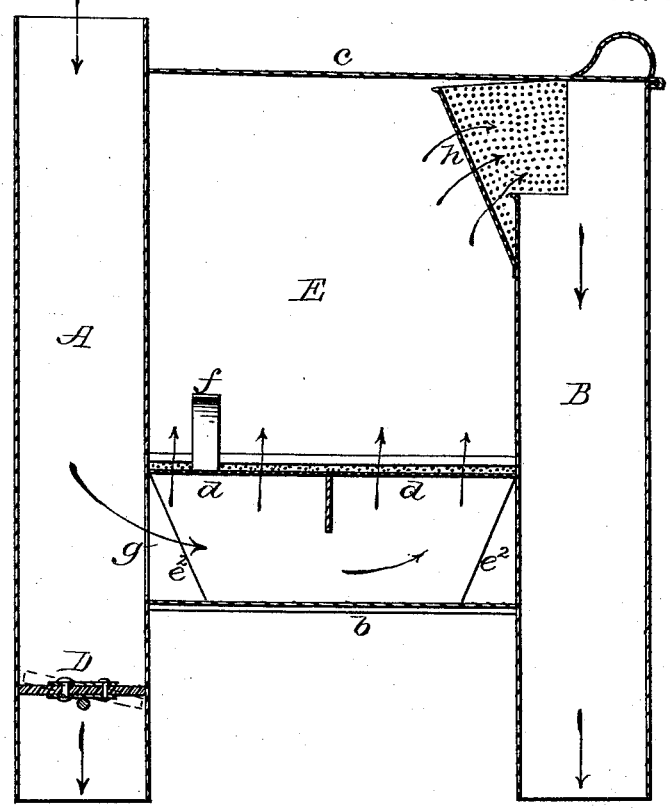
Figure 3:
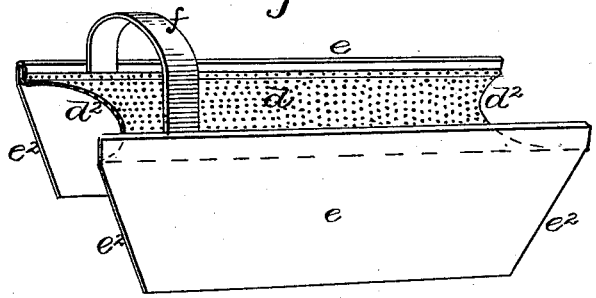

Referring to the drawings, Figure 1 represents a vertical section of my improved filter and cut-off. Fig. 2 shows the device in perspective, and Fig. 3 shows the removable strainer-trough for the filtering material. Fig. 4 shows a cross-section of the device, and Fig. 5 shows a strainer-trough V-shaped in cross section.

In constructing the device I take two sections of pipe, A and B, of suitable diameter and length, and between and outside of these pipes I form the filtering-chamber by three pieces of sheet metal, preferably tin, two side pieces, $a$, of equal size soldered to the outside of each pipe, and a bottom piece, $b$, soldered to the lower edges of the sides and to the pipes, making a deep oblong chamber, E, for containing the charcoal or other filtering material. A suitable cover, $c$, closes the top of the chamber. Within this chamber I place a trough-shaped strainer composed of a strainer, $d$, preferably of sheet metal, soldered to two vertical sides, $e$, and a handle, $f$, by which to place the strainer within and remove it from the case. The trough sides support the strainer above the bottom of the chamber, and they are inclined inward at their ends to permit the trough to be put in place and removed when desired.

I prefer to solder the bent edges of the strainer-sheet between the lapping edges of the trough sides, and to solder the handle to the inner sides of the lapping edges, so as to brace and stiffen the trough and prevent the breaking of the strainer-sheet in removing and replacing the trough.

To provide for fitting the trough within the filtering-chamber, the ends $d^2$ of the strainer-sheet are cut out to fit over the walls of the end pipes, while the ends $e^2$ of the trough sides are inclined away from said pipes. The width of the trough is just sufficient to fit snugly within the chamber of the case, and the strainer-sheet may be concave or trough-shaped in cross-section.

The house-pipe section A is cut away at $g$, so as to open into the case beneath the strainer, while the top of the cistern-connecting pipe B is cut away within the chamber, and provided with a strainer, $h$, through which the water flows from the filtering-chamber to the cistern.

I provide the house-pipe A at a point below the bottom of the casing with a valve, D, which I prefer to make of rubber, secured to an oval-shaped re-enforcing plate soldered to a strong wire stem passing through openings in the pipe. The valve-stem is bent at $i$, outside of the pipe, so as to form a spring-handle, $j$, which terminates in a right-angled end, $k$, to form a catch by which the valve is opened and closed and held in either position, engaging a perforation, $m$, in an inclined catch, $l$, when the valve is open, or a perforation, $r$, in an inclined catch, $n$, when the valve is closed.

The catch $l$ is at the bottom of the chamber and the catch $n$ is upon the side of the spout, and as the spring-handle of the valve stands at a right angle to the valve it will be seen that the valve will be held open, allowing the rain-water to pass freely down without entering the filter or passing into the cistern when the valve-handle is engaged by the lower catch, while the valve will be closed, turning the water through the filter and into the cistern, when the valve-handle is engaged by the upper catch.

For the purpose of allowing the water within the filter to escape from the same when the flow of water in the spout has ceased, and for the purpose also of allowing a smaller flow of water to pass directly down through the spout without entering the filter while a larger flow will be directed through the filter, which may be desirable in freezing weather, the upper inclined catch, n, is provided with an additional perforation, s, into which the end of the valve-handle may be inserted, placing the valve in a slightly oblique position in the spout, and forming a small passage by the valve. By having the valve placed in this manner the water within the filter, after the flow through the spout has ceased, may escape, preventing fouling of the filter by the stagnant water; and in freezing weather any smaller quantity of water passing down through the spout may be allowed to flow through the valve, preventing freezing, while a larger body caused by a heavy rain will be turned through the filter into the cistern, being too large to escape through the narrow aperture left by the valve.

It is of the greatest importance in devices of this kind to keep the filter clean; and the means which I provide for this purpose consists of the trough-handled strainer which supports the filtering material, and which can be removed by taking out the material from the open top of the casing, and taking hold of the trough-handle, pulling it up endwise, and replacing it in the same manner.

I claim—

1. The combination of a filter-casing, a rain-water spout forming one end of the casing and having an inlet into the same at the bottom, a cistern-pipe forming the other end of the casing, and having an outlet from the same at the top of it, and a strainer having its sides fitting inside of the sides of the casing at the bottom of the same, and formed with inwardly-bent lower edges, having a concave perforated top cut out at the ends to fit upon the spout and pipe, and provided with a handle across the perforated top, as shown and described.

2. The combination of the filter-casing, the rain-water spout forming one end of the casing, and having an inlet into the bottom of the same, and the cistern-pipe forming the other end of the casing, and having an outlet from the top of the same, with the upper catch, n, upon the spout having two perforations, the lower catch, l, upon the casing having one perforation, and the valve within the spout below the inlet, and provided with the handle at right angles to the same, engaging the perforations of the catches, whereby the valve may be held closed, open, and partly open, as shown and described.

3. The combination of the filter-casing, the rain-water spout forming one end of the casing, and having an inlet at the bottom of the same, the cistern-pipe forming the other end of the casing, and having an outlet-aperture at the closed top of the same provided with a perforated strainer, the strainer-trough fitted removably in the bottom of the casing above the same and above the inlet-aperture, and the cut-off valve in the spout below the inlet having an arm and catches for adjusting it to open, close, or partly close the spout, as shown and described.

In testimony whereof I have hereunto set my hand in the presence of two subscribing witnesses.

NELSON W. DAVIS.

Witnesses:
 LEWIS DAVIS,
 LITTLE DAWSON.